United States Patent Office 3,184,499
Patented May 18, 1965

3,184,499
REACTION PRODUCTS OF ALKYLDECABORANES AND DINITRILES
George J. Donovan, Boonton, Marvin M. Fein, Westfield, and Murray S. Cohen, Convent Station, N.J., assignors to Thiokol Chemical Corporation, Bristol, Pa., a corporation of Delaware
No Drawing. Filed Aug. 24, 1961, Ser. No. 135,712
9 Claims. (Cl. 260—465.6)

This invention relates to the reaction products of dinitriles and lower alkyl decaboranes, and to methods of making the same.

This application is a continuation-in-part of application Serial No. 772,631.

The products of this invention, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result from the use of the higher specific impulse material. The products of this invention, when incorporated with oxidizers, are capable of being formed into a wide variety of grains, tablets, and shapes, all with desirable mechanical and chemical properties. The propellants produced by the methods described in this application burn uniformly without disintegration when ignited by conventional means, such as pyrotechnic type igniters, and are mechanically strong enough to withstand ordinary handling.

The products of this invention are prepared by reacting a dinitrile of an aliphatic dicarboxylic acid having from 2 to 10 carbon atoms with a lower alkyl decaborane.

Suitable dinitriles are those of saturated unsubstituted dicarboxylic acids, such as cyanogen, malononitrile, succinonitrile, glutaronitrile, and adiponitrile. Also, dinitriles of saturated dicarboxylic acids having 2 to 6 carbon atoms and containing an ether linkage in the molecule form similar products. In these dinitriles of ether-dicarboxylic acids, only the nitrilo groups are reactive, the ether linkage being inert to the reaction. A typical ether-dinitrile of this type is $\beta,\beta'$-oxydipropionitrile.

Suitable lower alkyl decaboranes in which the alkyl groups contain from 1 to 4 carbon atoms include monomethyldecaborane, dimethyldecaborane, monoethyldecaborane, diethyldecaborane, monopropyldecaborane, monobutyldecaborane and the like, together with mixtures of such lower alkyl decaboranes. They can be prepared, for example, according to the method described in application Ser. No. 497,407, now U.S. Patent 2,999,117, filed March 28, 1955, by Elmar R. Altwicker, Alfred B. Garrett, Samuel W. Harris, and Earl A. Weilmuenster.

The reaction between these decaboranes and dinitriles is a condensation reaction in which solid linear polymeric products are produced and hydrogen is evolved. The reaction is believed initially to form a termolecular product from two moles of nitrile and one of alkyl decaborane, e.g., ethyldecaborane:

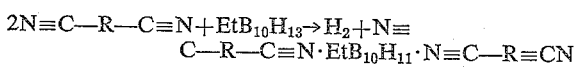

The terminal nitrile groups of the product are capable of further reaction to extend the polymer chain to give products believed to be of the form: $N(BN)_x$, where N is the dinitrile, B is the alkyl decaborane residue, and $x$ is an integer, where R is an aliphatic radical having 1 to 8 carbon atoms. Although high polymeric products may be formed if the reaction time is indefinitely prolonged, the reaction when carried out during time periods which would be feasible in industrial use generally results in low polymers where $x$ has a maximum value between about 5 and 15. The minimum value of $x$ is 1, which is definitive of a termolecular reaction product.

Although the reactants combine in a substantially equimolar ratio, particularly as the value of $x$ increases in the formula above, the ratio of reactants can be varied widely, generally being in the range from 0.1 to 10 moles of lower alkyl decaborane per mole of dinitrile. The reaction temperature can vary from 50 to 150° C. and the pressure can vary from .002 mm. of mercury to several atmospheres, although atmospheric pressure is preferred. Reduced pressure may be desirable where bubbles are formed in a viscous reaction mixture. The degree of completeness of the reaction can be determined by the rate and quantity of hydrogen evolved. Also, the rate at which solid products form in the reaction mixture indicates the degree of completion of the reaction. The reaction generally requires about 10 to 60 hours depending upon the ratio of reactants, the particular dinitrile utilized, and the temperature and pressure employed.

The process of this invention is illustrated in detail by the following examples which are to be considered not limitative.

Example I

A resin kettle was equipped with an efficient stirrer, thermometer, and a reflux condenser with a drying tube leading to a wet test meter, which monitored the gas evolution. A mixture of 7.5 g. (0.05 mole) of ethyldecaborane and 6.4 g. (0.05 mole) of $\beta,\beta'$-oxydipropionitrile was heated for 13.5 hours at 70 to 75° C. A red putty was formed and 0.03 mole of gas was evolved. The putty was extracted with benzene and dried in a vacuum oven to yield a red solid which was thermoplastic and softened at 80° C. to form a rubbery product, and which swelled in benzene to form a rubber. This product was soluble in $\beta,\beta'$-oxydipropionitrile and adiponitrile and softened in ethyldecaborane. The infrared absorption spectrum revealed strong C—H, B—H and C—O—C absorption maxima, and a trace of C≡N. There was evidence of polymer formation as shown by decreased absorption in the higher wave lengths. Chemical analysis showed the product to contain 31.1 percent boron, as compared to a calculated value for an $N(BN)_2$ type (N≡dinitrile and B≡$C_2H_5B_{10}H_{11}$) compound of 32.4 percent boron. The product was also found to contain 39.2 percent carbon, 9.1 percent hydrogen, and 9.4 percent nitrogen.

Example II

In a 150 ml. round bottom flask fitted with a stirrer, thermometer, and reflux condenser, there were placed 15.0 (0.1 mole) of ethyldecaborane and 12.4 g. (0.1 mole) of $\beta,\beta'$-oxydipropionitrile. This mixture was well stirred and heated to 50° C. and held constant for 7 hours. At the end of this time 0.440 cc. of gas had been liberated and the color had changed from a clear yellow to an orange color. The following morning the temperature had dropped to 30° C. and no gas had been evolved. The temperature was raised to 50–55° C. and held at that temperature for 9 hours. At the end of this period 1.17 cc. of gas had been liberated. The stirring was discontinued and the reaction mixture was cooled to room temperature under a dry nitrogen atmosphere.

Subsequently the reaction mixture was reheated and reaction was continued at a temperature of 50–55° C. for 9 hours (evolving 1.25 cc. of gas) and then cooled to room temperature. The material was continually getting more and more viscous as the reaction proceeded. The gas was forming large bubbles in the material and throwing the material out of the flask. To prevent this, the reaction was continued at reduced pressure (20 mm.) so as to aid in removing the gas as it was formed. After running for 3 more hours the material was a dough-like substance and could not be stirred. It was allowed to cool to room temperature and the pressure brought up to atmospheric by dry nitrogen. When the material was at room temperature, it was a red plastic which softened on heating at 55° C. This material was extracted for 18 hours with pentane and then with benzene in a Soxhlet extractor. After drying in a vacuum oven for several hours, the material was a mixture of a yellow powder and red-brown brittle solid. Chemical analysis showed the product to contain 35.4 percent boron, 33.2 percent carbon, 8.0 percent hydrogen and 8.32 percent nitrogen, which analysis corresponds with a product

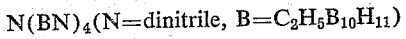

$N(BN)_4 (N = \text{dinitrile}, B = C_2H_5B_{10}H_{11})$

Example III

In a 75 cc. resin kettle, fitted with a thermometer, efficient stirrer, and a reflux condenser connected to a wet test meter, there were placed 15.0 g. (0.1 mole) of ethyldecaborane and 10.8 g. (0.1 mole) of adiponitrile. The apparatus and its contents were placed in an oil bath and heated at about 60° to 80° C. After 13½ hours, the reaction was stopped and the product was extracted with benzene for 2 hours. The benzene was decanted and the product was placed under vacuum. Before the product was completely free of benzene it was very rubbery. Some of this material was placed in a vacuum oven and completely dried. It was an orange thermoplastic which when placed in benzene again had the same rubbery characteristics. The thermoplastic softened at 40° C. to form a gum and was stable to 105° C. Upon cooling it solidified again. This process could be repeated several times without changing the product. During the reaction a total of about 1.5 liters of gas was evolved. After the reaction, 6.6 g. of ethyldecaborane and 3.0 g. of adiponitrile were recovered indicating that 0.056 mole of ethyldecaborane and 0.0723 mols of adiponitrile reacted. The gas evolution for 0.056 mole was approximately 90 percent of the theoretical. Chemical analysis showed the product to contain 34 percent boron.

Example IV

In a 250 ml. round bottom, three-necked flask, fitted with a thermometer, an efficient stirrer and a reflux condenser connected to a wet test meter, there were placed 2.0 g. (0.025 mole) of succinonitrile and 11.25 g. (0.075 mole) of a mixture of ethyldecaboranes predominantly comprising ethyldecaborane and small amounts of diethyl- and triethyldecaboranes. The reaction mixture was heated at 60° to 70° C. for 52 hours. During this time 80 cc. of gas were liberated. Red brittle solids were obtained from this reaction, which solids were insoluble in the mixture of ethyldecaboranes. No solid or liquid products were isolated from the liquid portion.

Example V

A mixture of 0.01 mole of ethyldecaborane and 0.01 mole of $\beta,\beta'$-oxydipropionitrile was heated for 13 hours at 75° C. The material became very viscous and the temperature was raised to 110° C. for 3 additional hours. At this point the material was turning solid and was cooled to room temperature. The product was a hard brittle solid.

Example VI

A mixture of 0.01 mole of ethyldecaborane and 0.01 mole of adiponitrile was heated for 15 hours at 75° C. The material became very viscous and the temperature was raised to 110° C. for 4 additional hours. The material was turning solid so it was cooled to room temperature. The product was a hard brittle glass.

Example VII

A mixture of 0.01 mole of ethyldecaborane and 0.01 mole of $\beta,\beta'$-oxydipropionitrile was heated for 13 hours at 75° C. When the material became very viscous, the temperature was raised to 110° C. Just before the material was turning solid, 0.005 mole of ethyldecaborane was added. Heating was continued for 2 additional hours. After cooling to room temperature, the material was a brittle glass. There appeared to be no difference in physical properties as compared to the product in Example V.

Example VIII

A mixture of 0.01 mole of ethyldecaborane and 0.01 mole of $\beta,\beta'$-oxydipropionitrile was heated for 13 hours at 75° C. When the material became viscous, the temperature was raised to 110° C. Just before the material was turning solid, an additional 0.01 mole of ethyldecaborane was added. After 3 hours of heating, it was cooled to room temperature. The material in the bottom of the test tube was a glass, but at the top it was rubbery. Apparently the ethyldecaborane had plasticized the top portion of the product.

Example IX

A mixture of 0.03 mole of ethyldecaborane and 0.01 mole of $\beta,\beta'$-oxydipropionitrile was heated for 18 hours at 90° C. The material became extremely viscous and was then cooled to room temperature. At this temperature the material was a gum.

The products from Examples V, VI, VII and VIII were heated in a vacuum oven at 70° C. for 56 hours. At the end of this time, all the products were brittle glasses.

The boron containing materials produced by practicing the methods of this invention can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this, the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

Although specific embodiments have been shown and described, it is to be understood that they are illustrative and are not limiting on the scope and spirit of the invention.

We claim:
1. A method for making a solid reaction product of a lower alkyl decaborane and a dinitrile which comprises heating a member selected from the group consisting of $\beta,\beta'$-oxydipropionitrile and dinitriles of the formula $N\equiv C-R-C\equiv N$, wherein R is a saturated unsubstituted aliphatic radical having from 1 to 8 carbon atoms, with from 0.1 to 10 molar parts of a lower alkyl decaborane per mole of dinitrile at a temperature between about 50° C. and about 150° C.

2. A method as in claim 1 wherein said lower alkyl decaborane is ethyl decaborane.

3. A method as in claim 2 wherein said dinitrile is $\beta,\beta'$-oxydipropionitrile.

4. A method as in claim 2 wherein said dinitrile is adiponitrile.

5. A method as in claim 2 wherein said dinitrile is succinonitrile.

6. A product prepared by reacting substantially equimolar quantities of a member selected from the group consisting of dinitriles of adipic, succinic and $\beta,\beta'$-oxydipropionic acids and a lower alkyl decaborane for from 10 to 60 hours at a temperature between about 50° C. and about 150° C.

7. A product as in claim 6 wherein said dinitrile is $\beta,\beta'$-oxydipropionitrile and said alkyl decaborane is ethyl decaborane.

8. A product as in claim 6 wherein said dinitrile is adiponitrile and said alkyl decarborane is ethyl decaborane.

9. A product as in claim 6 wherein said dinitrile is succinonitrile and said alkyl decaborane is ethyl decaborane.

References Cited by the Examiner
UNITED STATES PATENTS
3,030,407   4/62   Graminski et al. _____ 260—465.1

OTHER REFERENCES
Broadley: General Electric Co. Report No. 55248, pages 8, 9 and 11, January 6, 1948.

Schechter et al.: "Boron Hydrides and Related Compounds," 2nd Ed., page 26 (1954), Callery Chemical Co.

CHARLES B. PARKER, *Primary Examiner.*
L. D. ROSDOL, JOSEPH P. BRUST, *Examiners.*